United States Patent
Steibel et al.

(10) Patent No.: US 7,600,979 B2
(45) Date of Patent: Oct. 13, 2009

(54) CMC ARTICLES HAVING SMALL COMPLEX FEATURES

(75) Inventors: James Dale Steibel, Mason, OH (US); Douglas Melton Carper, Trenton, OH (US); Suresh Subramanian, Mason, OH (US); Stephen Mark Whiteker, Covington, KY (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 11/563,747

(22) Filed: Nov. 28, 2006

(65) Prior Publication Data

US 2008/0124512 A1    May 29, 2008

(51) Int. Cl.
*F01D 5/14* (2006.01)
(52) U.S. Cl. .................... 416/230; 416/229 A
(58) Field of Classification Search ............. 416/229 A, 416/230, 224, 193 A, 223 A, 229 R
See application file for complete search history.

(56) References Cited

U.S. PATENT DOCUMENTS

| | | | |
|---|---|---|---|
| 3,349,157 A | * | 10/1967 | Parsons ................ 416/230 |
| 3,731,360 A | * | 5/1973 | Stone, Jr. .............. 416/230 |
| 3,942,231 A | * | 3/1976 | Whitaker ............... 416/230 |
| 5,141,400 A | | 8/1992 | Murphy et al. |
| 5,279,892 A | | 1/1994 | Baldwin et al. |
| 5,375,978 A | | 12/1994 | Evans et al. |
| 5,672,417 A | * | 9/1997 | Champenois et al. ..... 416/230 |
| 6,431,837 B1 | * | 8/2002 | Velicki ................ 416/230 |
| 7,066,717 B2 | * | 6/2006 | Morrison et al. ........ 416/230 |

FOREIGN PATENT DOCUMENTS

JP    02196103 A  *  8/1990

OTHER PUBLICATIONS

Schreiber Tanslation, Inc., JP 02196103 A: Ceramic Turbine Parts, Mar. 2009, pp. 1-12.*

* cited by examiner

*Primary Examiner*—Richard Edgar
(74) *Attorney, Agent, or Firm*—McNees Wallace & Nurick LLC

(57) ABSTRACT

A ceramic matrix composite (CMC) component for gas turbine engines, the component having fine features such as thin edges with thicknesses of less than about 0.030 inches and small radii of less that about 0.030 inches formed using the combination of prepreg plies layed up with non-ply ceramic inserts. The CMC components of the present invention replace small ply inserts cut to size to fit into areas of contour change or thickness change, and replace the small ply inserts with a fabricated single piece discontinuously reinforced composite insert, resulting in fewer defects, such as wrinkles, and better dimensional control.

9 Claims, 7 Drawing Sheets

CMC ARTICLES HAVING SMALL COMPLEX FEATURES

FIELD OF THE INVENTION

The present invention relates generally to ceramic matrix turbine engine components, and more particularly, to a ceramic matrix composite gas turbine engine component having small complex features.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. The higher temperatures reach and surpass the limits of the material comprising the components in the hot section of the engine and in particular the turbine section of the engine. Since existing materials cannot withstand the higher operating temperatures, new materials for use in high temperature environments need to be developed.

As the engine operating temperatures have increased, new methods of cooling the high temperature alloys comprising the combustors and the turbine airfoils have been developed. For example, ceramic thermal barrier coatings (TBCs) have been applied to the surfaces of components in the stream of the hot effluent gases of combustion to reduce the heat transfer rate, provide thermal protection to the underlying metal and allow the component to withstand higher temperatures. These improvements help to reduce the peak temperatures and thermal gradients of the components. Cooling holes have been also introduced to provide film cooling to improve thermal capability or protection. Simultaneously, ceramic matrix composites have been developed as substitutes for the high temperature alloys. The ceramic matrix composites (CMCs) in many cases provide an improved temperature and density advantage over metals, making them the material of choice when higher operating temperatures and/or reduced weight are desired.

A number of techniques have been used in the past to manufacture hot section turbine engine components, such as turbine airfoils using ceramic matrix composites. One method of manufacturing CMC components, set forth in U.S. Pat. Nos. 5,015,540; 5,330,854; and 5,336,350; incorporated herein by reference in their entirety and assigned to the assignee of the present invention, relates to the production of silicon carbide matrix composites containing fibrous material that is infiltrated with molten silicon, herein referred to as the Silcomp process. The fibers generally have diameters of about 140 micrometers or greater, which prevents intricate, complex shapes having features on the order of about 0.030 inches, such as turbine blade components for small gas turbine engines, to be manufactured by the Silcomp process.

Other techniques, such as the prepreg melt infiltration process have also been used. However, the smallest cured thicknesses with sufficient structural integrity for such components have been in the range of about 0.030 inch to about 0.036 inch, since they are manufactured with standard prepreg plies, which normally have an uncured thickness in the range of about 0.009 inch to about 0.011 inch. With standard matrix composition percentages in the final manufactured component, the use of such uncured thicknesses results in final cured thicknesses in the range of about 0.030 inch to about 0.036 inch for multilayer ply components, which is too thick for use in small turbine engines.

Complex CMC parts for turbine engine applications have been manufactured by laying up a plurality of plies. In areas in which there is a change in contour or change in thickness of the part, plies of different and smaller shapes are custom cut to fit in the area of the contour change or thickness change. These parts are laid up according to a complicated, carefully preplanned lay-up scheme to form a cured part. Not only is the design complex, the lay-up operations are also time-consuming and complex. Additionally, the areas of contour change and thickness change have to be carefully engineered based on ply orientation and resulting properties, since the mechanical properties in these areas will not be isotropic. Because the transitions between plies along contour boundaries are not smooth, these contours can be areas in which mechanical properties are not smoothly transitioned, which must be considered when designing the part and modeling the lay-up operations.

FIG. 1 depicts an exemplary uncoated airfoil (uncooled) 10. In this illustration the airfoil 10 comprises a ceramic matrix composite material. The airfoil 10 includes an airfoil portion 12 against which a flow of gas is directed. The airfoil 10 is mounted to a disk (not shown) by a dovetail 14 that extends downwardly from the airfoil portion 12 and engages a slot of complimentary geometry on the disk. The airfoil 10 does not include an integral platform. A separate platform can be provided to minimize the exposure of the dovetail 14 to the surrounding environment if desired. The airfoil has a leading edge section 18 and a trailing edge section 16. Such a composite airfoil is fabricated by laying up a plurality of plies.

FIG. 2 is a prior art illustration (perspective) of how such a composite airfoil of FIG. 1 has been laid up. FIG. 3 represents a front view of the lay-up of these pre-preg plies. The airfoil 10 comprises a plurality of pre-preg plies 40 arranged around a centerplane 24. There are a number of root (pre-preg) plies 41 and smaller (pre-preg) plies 42 arranged between larger (prepreg) plies 40, 44. Referring back to FIG. 1, the smaller plies, in particular root plies 41, are required to provide the dovetail geometry. In addition, each of the plies 40 includes tow that is oriented in a predetermined direction. Of course, care must be taken to not only provide the proper size ply in the proper location, but also to properly orient the tow direction of each of the plies.

Still other techniques attempt to reduce the thickness of the prepreg plies used to make up the multi-layer plies by reducing the thickness of the fiber tows. Theoretically, such processes could be successful in reducing the ply thickness. However, practically, such thin plies are difficult to handle during part manufacturing, even with automated equipment. This can result in wrinkling of the thin plies, a manufacturing defect that can result in voids in the article, and a deterioration of the mechanical properties of the article, and possible ply separation. In addition, problems arise, as airfoil hardware requires the ability to form small radii and relatively thin edges, features required in smaller articles, such as narrow chord airfoils. The high stiffness of the fibers, typically silicon carbide, in the prepreg tapes or plies, can lead to separation when attempting to form the plies around tight bends and corners with small radii. The fiber coatings may also crack or be damaged. This leads to a degradation in the mechanical properties of the article in these areas with resulting deterioration in durability.

What is needed is a method of manufacturing CMC turbine engine components that permits the manufacture of features having a thickness, particularly at the edges, in the range of about 0.015 inch to about 0.021 inch, as well as small radii, the radii also in the range of less than about 0.030 inches. In addition, a method of manufacturing CMC turbine engine components having features with a thickness less than about 0.021 inch is also needed.

SUMMARY OF THE INVENTION

The present invention is a ceramic matrix composite (CMC) component for use at high temperatures, such as in gas turbine engines, the components having fine features such as thin edges with thicknesses of less than about 0.030 inches and small radii of less that about 0.030 inches formed using the combination of prepreg plies layed up with non-ply ceramic inserts. Turbine components produced using the processes of the present invention minimize the use of ply inserts cut to size to fit into areas of contour change or thickness change, particularly in applications in which there is a significant thickness change over a short distance, wherein, the short or small distances are measured in a direction substantially transverse to the direction of changes in thickness. These thickness changes are considered substantial in ply lay-ups when the change in thickness is as little as 10%, since failure to properly design a component to account for such changes can result in defects in the finished component.

Current practices require cutting small ply inserts to size to enable net shape lay-up, which is necessary to minimize compaction during cure resulting in fewer defects, such as wrinkles, and better dimensional control.

Turbine components are modeled using non-ply ceramic inserts in combination with prepreg layers in the present invention. The composite component comprises a lay-up of substantially continuous plies, each ply in the lay-up of substantially continuous plies having a plurality of tows extending substantially parallel to each other in an uncured matrix material, each ply being positioned so that the tows extend at a preselected angle to the tows in an adjacent ply. Non-ply ceramic inserts, as used herein, means both discontinuously reinforced composite inserts and monolithic ceramic inserts. The components are modeled using prepreg plies or tapes in combination with the non-ply ceramic inserts. In areas where complex features are present, non-ply ceramic inserts are incorporated into the component, so that the turbine component is a combination of prepreg layers and non-ply ceramic inserts. Although prepreg plies may be cut to a smaller size and included in combination with substantially full length prepreg layers and the non-ply ceramic inserts, the non-ply ceramic inserts are modeled into the component to replace a substantial number of the small prepreg plies that previously were cut to size to provide for a change in thickness or a change in contour, the replacement of which provides a predetermined shape. The insert or discontinuously-reinforced composite portion is adjacent to the reinforced ceramic matrix composite portion comprising the plurality of continuous tows It is cured to the reinforced ceramic matrix composite portion to form the component.

The non-ply ceramic insert or piece is designed and produced to minimize the number of small fiber plies, cut and inserted into a portion of a component to allow for a change in thickness or contour, while maximizing the number of continuous fiber plies that extend along the substantially full length of the component. A non-ply ceramic inserts may include a plurality of configurations. The discontinuously reinforced composite insert may be made by cutting pre-preg plies into small pieces, mixing the small pieces with a slurry of matrix material to form a paste or putty. Lengths of fiber or tow may be substituted for the cut plies or may be used along with and in addition to the cut plies. The paste or putty is applied into cavities of the component, as it is layed up, forming an uncured insert, which cures on drying. Alternatively, the mixture can be molded and cured to form a cured insert, which is assembled into the component. Inserts made from discontinuously reinforced composite, while having properties that are not quite isotropic, nevertheless are less directional than a cured CMC lay-up. These mechanical properties are referred to herein as "substantially isotropic," since they are not quite isotropic, but are not directional.

An advantage of the present invention is that a plurality of small, cut fabric plies can be replaced by a single discontinuously reinforced composite insert. The discontinuously reinforced composite insert can be provided as a material having substantially isotropic properties.

Another advantage of the present invention is that manufacture of an aircraft engine component can be simplified by elimination of a complex, time-consuming lay-up scheme.

Yet another advantage of the present invention is that the use of discontinuously reinforced composite inserts will allow for the inclusion of fine features, such as thin sections and small radii, without compromising the mechanical properties of the component.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention provides an aircraft engine component made of a CMC. The component comprises a plurality of substantially continuous pre-preg plies that extend substantially the length of the component. At least one discontinuously reinforced composite insert is incorporated into the component, the discontinuously reinforced composite insert having substantially isotropic properties. The discontinuously reinforced composite insert may extend substantially the length of the component, but may be modeled to replace specially cut, smaller pre-preg plies at contours and at changes in discontinuously reinforced composite part thickness.

As used herein, a fiber means the smallest unit of fibrous material, having a high aspect ratio, having a diameter that is very small compared to its length. Fiber is used interchangeably with filament. As used herein, a tow means a bundle of continuous filaments. As used herein, matrix is an essentially homogenous material into which other materials, fibers or tows specifically, are embedded. As used herein, a pre-preg-ply, or simply pre-preg, means a sheet of unidirectional tow, or short lengths of discontinuous fiber impregnated with matrix material, the matrix material being in resin form, partially dried, completely dried or partially cured. As used herein, a preform is a lay-up of pre-preg plies that may or may not include an additional insert, into a predetermined shape prior to curing of the pre-preg plies.

Figure 4:
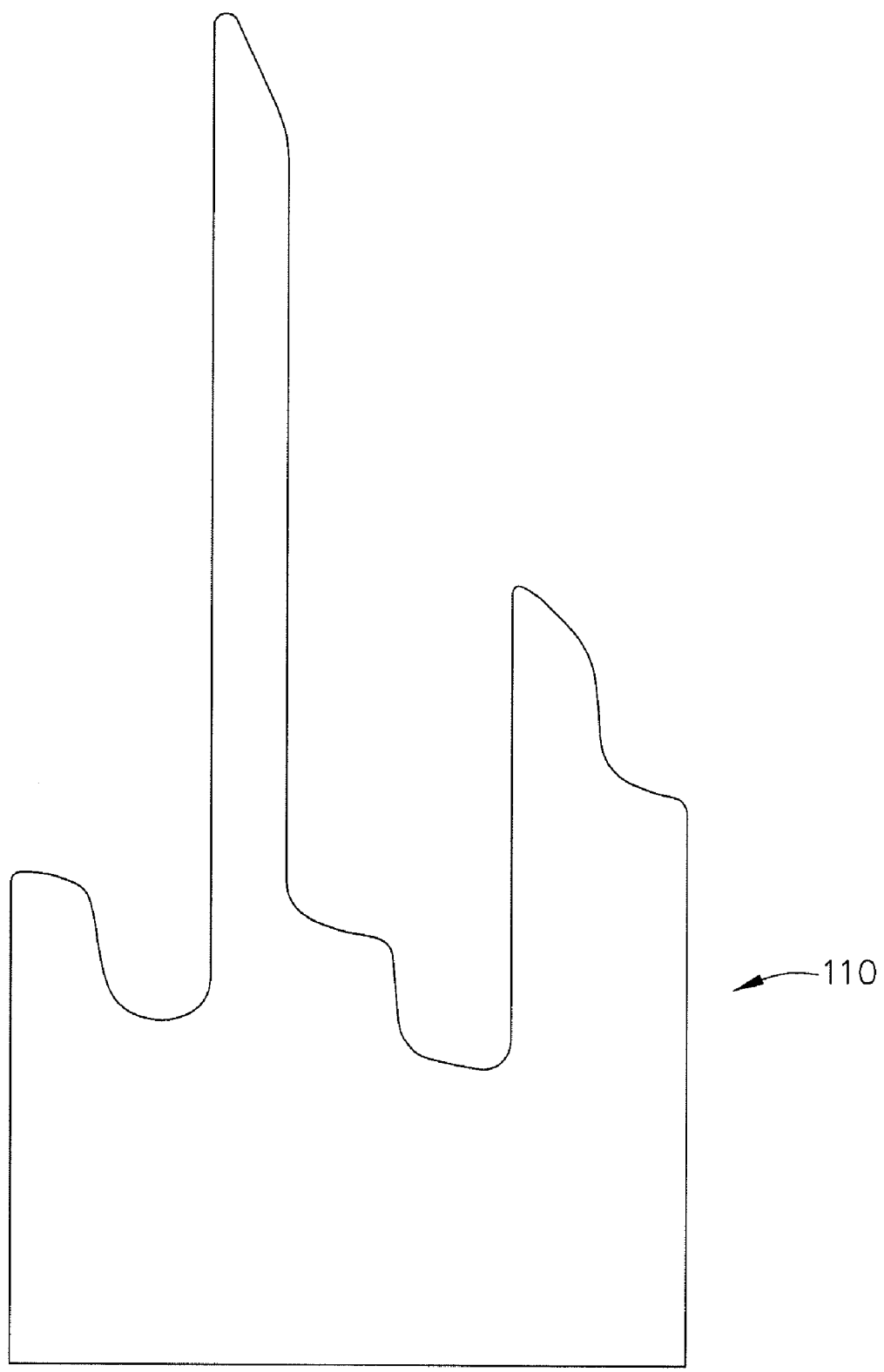
FIG. 4 depicts an insert for use in the present invention replacing the plies set forth in FIG. 3.

The present invention is depicted as an insert 110 in FIG. 4. The depicted insert is a discontinuously reinforced composite material having substantially isotropic properties in its preferred embodiment. Substantially isotropic properties may deviate slightly from being exactly identical in all directions, but are distinguishable from anisotropic properties, which are clearly different, that is, having mechanical properties that are distinctly different directions at a point in a body of it. Stated differently, an anisotropic material has no planes of material symmetry. The discontinuously reinforced composite insert 110 can be manufactured by any convenient method. The discontinuously reinforced composite insert is not comprised of laid-up plies of material, but rather is a block of material that may have a predetermined shape, and that can be handled as an individual piece. Insert 110 may be fully cured or partially cured and then machined to the predetermined shape. The discontinuously reinforced composite insert may be fully dense or partially dense. If partially dense, as will become evident, the insert can be made fully dense as part of the operations in forming a turbine engine component.

The insert may be formed by mixing chopped fiber with a matrix material. A variant utilizes chopped tow, chopped pre-preg plies, or chopped plies that are cured or partially cured. Typically, a coating selected from the group consisting of boron nitride, silicon nitride, silicon carbide and combinations thereof as is known in the art is applied to the fiber. This material is thoroughly mixed with matrix material to form a slurry, which can have a discontinuously reinforced composite viscosity ranging from a fluid to a thick paste. The material can be molded by any convenient means into a final shape or intermediate shape and cured. The cured part can be final machined into a predetermined shape if necessary. Examples of shape-forming techniques include extrusion, casting, injection molding and pressing methods. If used as a paste or slurry, the material that forms the insert may be applied to areas of the preform that lacks material. In this circumstance, it may be necessary for the preform to provide support for the uncured paste or slurry. If this cannot be done, the formulation can be adjusted, as is known, with polymer additions or sub-micron powder, to form a thixotropic composition that is self-supporting. Chopped tow or filament lengths used for either paste or slurry typically ranges from about 0.1 inch to 1 inch. The fiber loading typically ranges from about 10% by volume to about 50% by volume. These parameters are determined by the mechanical properties requirements of the article, as well as to allow molten silicon densification throughout the component.

The discontinuously reinforced composite insert is used in conjunction with a lay-up of plies for forming a turbine engine component. The insert is assembled with the plies and maintained with the plies as the component is cured. If a fully integrated bond is desired, a number of options are available, the option to be selected depending upon ease of obtaining the desired bond. Thus, the insert itself may be a partially cured molded article that can bond with the plies in the lay-up for the component, the partially cured preform bonding with the resin matrix of the pre-preg plies during curing of the component. The insert may be carbon rich to facilitate a diffusion bond integral with the CMC matrix portion, the integral bond formed during molten silicon infiltration. Alternatively, when applied as a paste, the insert material can cure with the resin matrix of the pre-preg plies during curing of the component.

The final result is a fully dense turbine engine component having at least two distinct portions, a cured reinforced ceramic matrix composite portion comprising a plurality of continuous tows extending substantially parallel to each other in a matrix; and a discontinuously-reinforced composite portion having substantially isotropic properties located at regions of contour changes and thickness changes of the component. The discontinuously reinforced composite portion comprises discontinuous fiber-including material in a matrix material. The discontinuously reinforced composite portion is adjacent to the reinforced ceramic matrix composite portion and is cured to the reinforced ceramic matrix composite portion. However, the use of the insert permits the formation of very tight radii, and/or to form thin sections that were not achievable with prior art plies laid up to form the thin section of, for example, a narrow chord airfoil. Furthermore, the formation of discontinuously reinforced composite inserts or the use of the insert material as a paste eliminates the prospect of wrinkling, and related defects as a result of handling a large number of small, thin plies.

Figure 1:
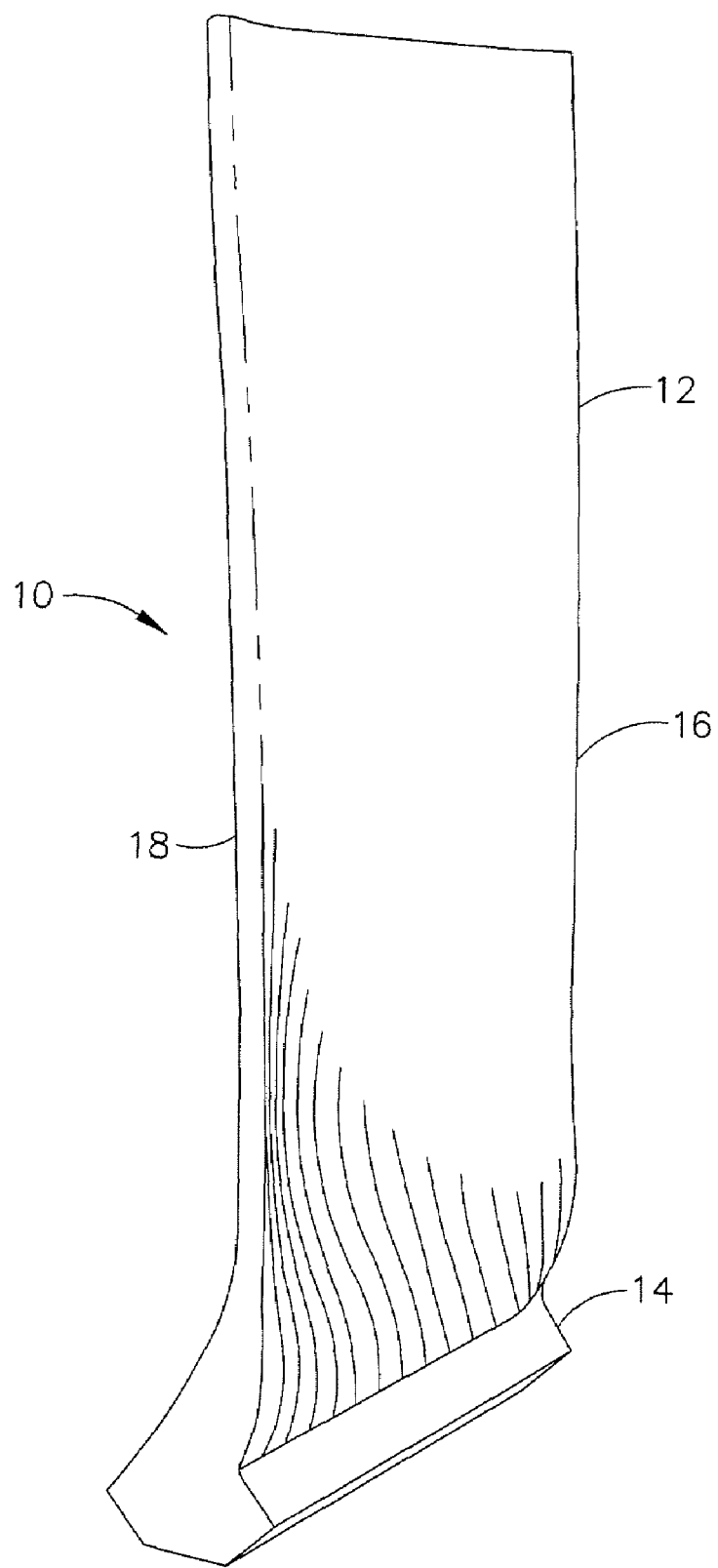
FIG. 1 depicts a CMC airfoil for use in a gas turbine engine.
Figure 2:
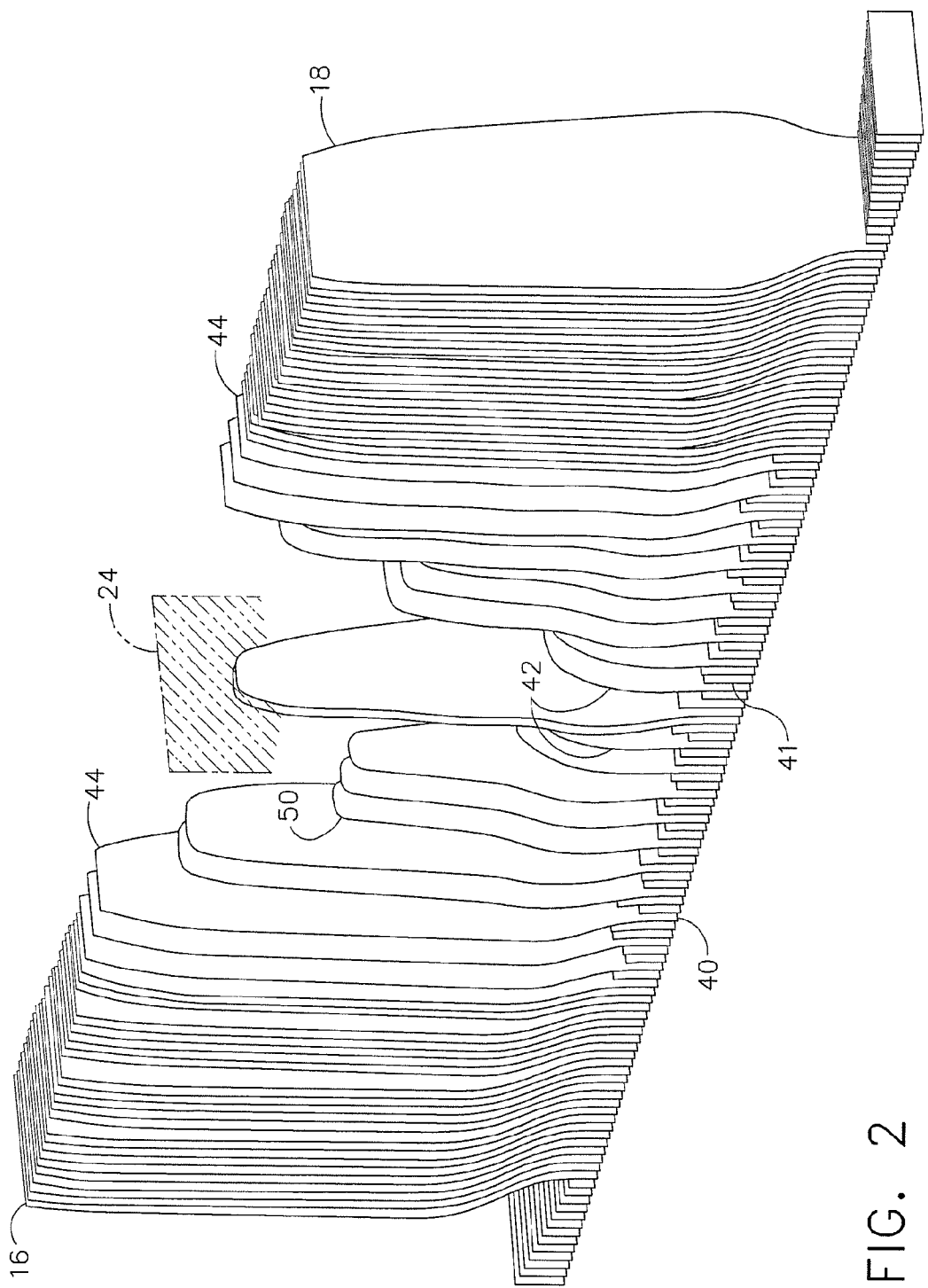
FIG. 2 depicts a prior art method for laying up the CMC airfoil of FIG. 1.
Figure 3:
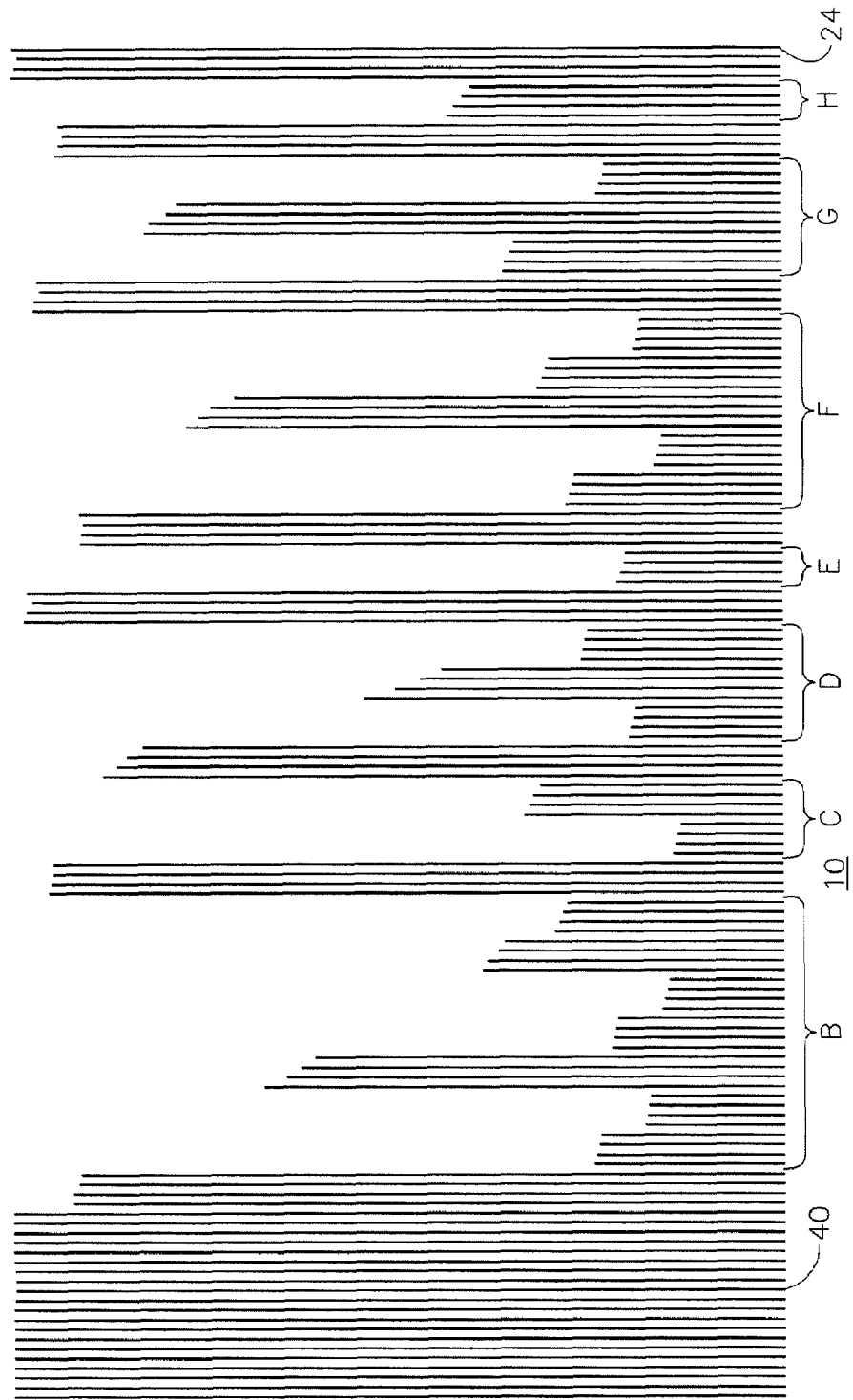
FIG. 3 depicts a front view of the lay-up of FIG. 2.
Figure 5:
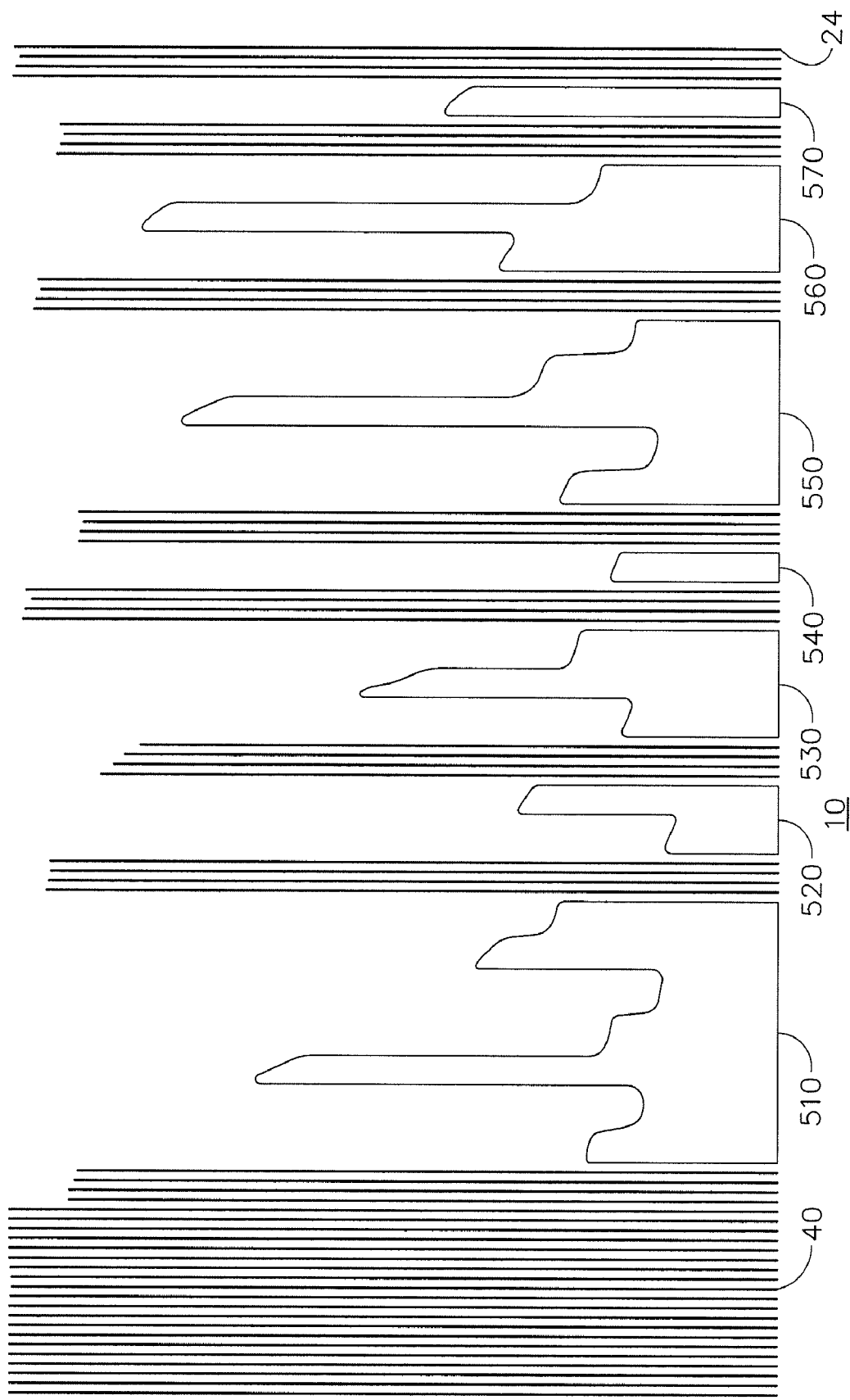
FIG. 5 depicts an airfoil of the present invention layed up with inserts and pre-preg plies.

The present invention is depicted in FIG. 5 as an alternate method of manufacturing the airfoil of FIG. 1. In one embodiment, this invention envisions replacing root plies 41 and smaller plies 42 with a discontinuously reinforced composite insert 110 of FIG. 4 shown as inserts 510, 520, 530, 540, 550, 560, and 570 in FIG. 5. The insert 110 preferably has substantially isotropic properties. The inserts depicted in FIG. 5 as 510, 520, 530, 540, 550, 560, and 570 replace the plies in FIG. 3 located at B, C, D, E, F, G and H respectively. The remaining plies in the preform are inserted prior to curing. The plies extend the full length or substantially the full length of the component, the orientation of each of the plies being determined to provide the required mechanical properties for the component, here an airfoil. Thus, a 0° orientation refers to a ply that is laid up so that the line of fiber tows is substantially parallel to a preselected plane of the component, for example the long dimension or axis of a turbine blade. A 90° orientation refers to a pre-preg ply oriented at substantially 90° to the preselected plane. The remaining plies may be laid up in an altering formation, such as ±45° to the preselected plane of the part. Thus, for example, a sequence of plies is laid up in a sequence of 0°, +45°, −45°, 90°, 45°, +45° so that the component has tensile strength in directions other than along the axis. In this manner, the strength of the component can be modified to be directional (anisotropic) or somewhat isotropic as desired. For the article depicted in FIG. 5, the final cured component is a CMC having tows extending in preselected orientations, the plies which extended the full length of the component or substantially the full length of the component yielding tows in a matrix extending substantially parallel to each other as a group. In CMCs having a plurality of plies, the cured component yields a plurality of groups of continuous tows, the tows in each group extending substantially parallel to each other in a matrix, each group oriented at a preselected angle to the tows in at least one other group and each group having substantially anisotropic properties. However, the inserts adjacent to plies have substantially isotropic properties.

Figure 6:
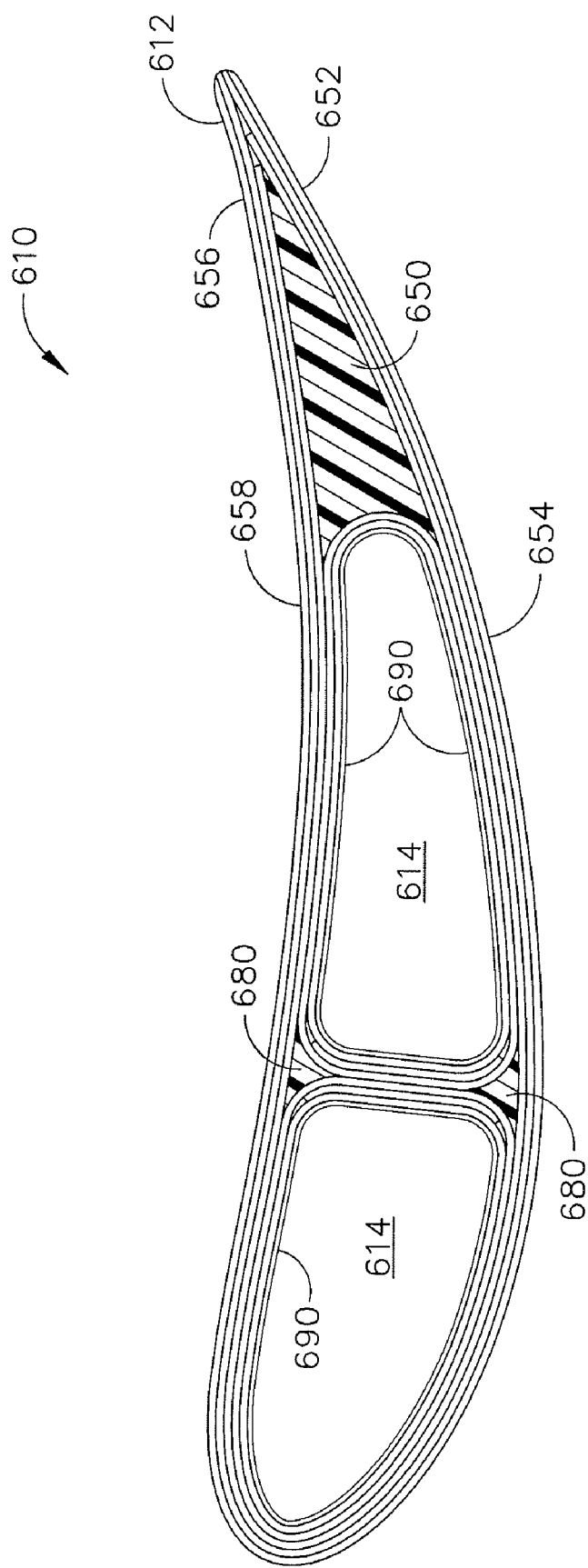
FIG. 6 depicts a lay-up of a narrow cord blade, in cross-section, the blade having a trailing edge insert and a rib inserts.

In an alternate embodiment of the present invention, the inserts are used to provide significant thickness changes over a short distance in a thinner cross-section airfoil than is currently available using existing plies. FIG. 6 depicts two applications of the present invention for use in a narrow chord turbine blade 610 in which a portion of the thin trailing edge 612 includes a discontinuously reinforced composite insert 650 having substantially isotropic properties. The blade also includes premolded rib inserts 680, made of the discontinuously reinforced composite of the present invention.

The narrow chord turbine blade of FIG. 6 depicts a pair of air passageways 614 that are fabricated into blade 610. Both the trailing edge insert 650 and rib inserts 680 are prefabricated using the discontinuous materials set forth in the present invention. Both insert 650 and inserts 680 replace a plurality of small plies that are extremely difficult to handle during lay-up operations. Inserts 650, 680 are molded to near-net shape and machined to final dimensions after being compacted and cured to remove the volatiles.

As shown in FIG. 6, insert 650 is positioned within the trailing edge replacing a plurality of small plies that would be required to fill the gap between full length plies having a first end 652 on the suction side 654 a second end 656 on the pressure side 658 of the blade. As shown in FIG. 6, insert 650 is bounded by three full-length plies extending from the suction side 654 to the pressure side 658. As used herein full length means that the plies extend the height of the blade from top to bottom, FIG. 6 being a cross-section through the height, extending into and out of the plane of FIG. 6. It is envisioned that insert 650 can be made somewhat larger (increased in cross-section) than shown in FIG. 6, thereby allowing replacement of at least one of the depicted full length plies. At least one full-length ply having a first end 652 and a second end 656 is required on the suction side 654 and the pressure side 658. The direction of maximum stress in each blade design is known, and at least one ply is oriented, typically on the outside of the insert, so that its fibers run in a direction parallel to the direction of maximum stress. Each ply is of standard thickness of about 10 mils, comprising a plurality of unidirectional tows. However, if additional strength is needed in directions offset from the direction of maximum stress, the inserts permit the substitution of thinner plies. These plies use thin, unidirectional tows, allowing ply thicknesses of less than 10 mils, generally from 5 mils to 9 mils. Although these thin plies are difficult to handle, they can be accommodated by the manufacturing process because they are full length plies that are laid up against a full length insert and used in limited numbers, replacing only one or two plies of standard thickness. Of course, insert 650 is increased in size proportionally to account for the difference in ply thickness when such thin plies are substituted for plies of standard thickness.

Inserts 680 are provided solely to replace the plurality of small plies used at the change in thickness between air passages 614. As should be obvious, the lay-up of plies in this area requires many small plies having different widths that must be precisely placed. The fabrication of inserts 680 using the materials and methods of the present invention and placement of the insert during lay-up is substantially easier and less prone to manufacturing error requiring scrapping of a cured blade than laying up of a plurality of small plies.

To manufacture a blade such as the blade depicted in FIG. 6, continuous plies 652 along the suction side 654 are laid up on a lay-up tool. A mandrel (not shown) having inner wrap plies 690 is then placed at the appropriate locations, here where the air passageways are formed, as shown in FIG. 6. The outer plies extending from first end 652 on the suction side 654 to second end 656 on the pressure side 658 are wrapped over to complete the lay-up sequence. The laid up blade is then cured under pressure at temperature to remove the volatiles and to fully consolidate the blade. After consolidation and curing, the mandrel is removed to provide air passageways 614. The matrix plies are placed over the outer surface of the insert pieces 650, 680 to enhance bonding between the insert pieces and the continuous plies. Depending on the technique used, as discussed above, the blade can then be densified using the melt infiltration process.

EXAMPLE 1

A slurry was prepared by utilization of SiC/SiC unidirectional prepreg tape that is coated silicon carbide tow in a silicon carbide matrix. The fibers comprising the tow typically are coated with a debond coating such as boron nitride. The backing was removed from the prepreg by exposing the fabric to liquid nitrogen. The fabric was then cut into pieces having a size of about ¼ square in. and smaller. A proprietary solution of Cotronics Resbond 931, a high temperature ceramic graphite adhesive resin available from Cotronics Corp. of Brooklyn N.Y. and acetone was prepared by mixing with an equal weight of acetone. The chopped pre-preg, about 3 g, was added to the solution in a weight ratio of about 3:1 pre-preg: solution to form a mixture. The mixture was blended by a suitable means to achieve a uniform consistency. This can be achieved by shaking, stirring, ball milling or other mixing techniques. The viscosity of the mixture can be adjusted as required consistent with its intended use by adding additional acetone or by allowing solvent to evaporate. For example, the mixture can be cast into rough form and machined into final form or cast into a preselected final form and allowed to cure. Alternatively, suitable submicron powders can be added to the mixture followed by additional blending. The paste can then be applied as previously discussed.

Figure 7A:
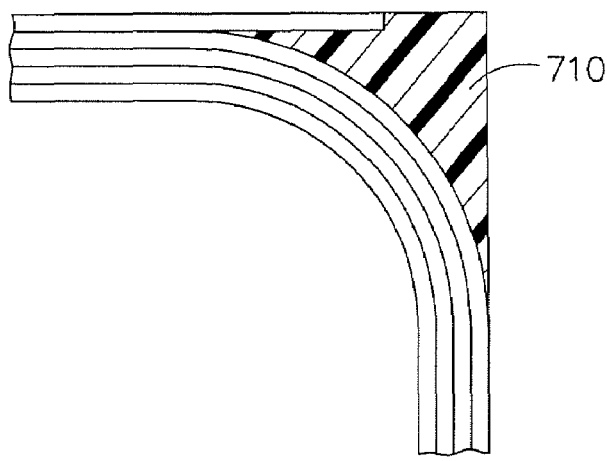
FIGS. 7A. 7B and 7C depict inserts of the present invention positioned at contour changes and at thickness changes over short distances.
Figure 7B:
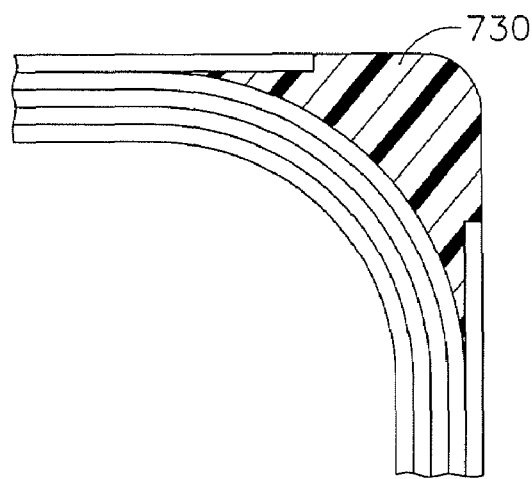
Figure 7C:
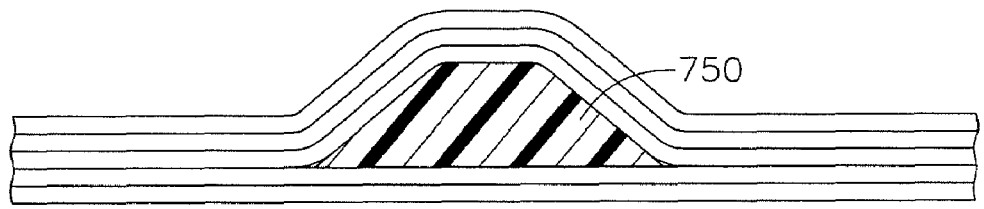

The present invention has been described for use in the airfoil section of a narrow chord turbine blade. However, the present invention can find use in other hot section components, such as liners, vanes, center bodies and the like, as well as other sections of the blade such as platforms and dovetails, in which small multiple plies are cut to size to account for a contour change or a thickness change, particularly over a short distance, and the substantially isotropic properties of a discontinuously reinforced ceramic insert are adequate for the application. These applications are illustrated in FIG. 7. Two of the applications are outside corners. FIG. 7A depicts the use of a ceramic insert 710 of the present invention for use in a blade platform fillet, the insert 710 overlying the full length plies and replacing small corner plies. FIG. 7B depicts a similar use of the ceramic insert 730 as a replacement for small multiple ceramic plies along sharp outside corners, the insert 730 overlying the full length plies and replacing small corner plies. FIG. 7C depicts the use of a ceramic insert 750 of the present invention as a replacement for small multiple ceramic plies for a stiffener, in which there is a large change of contour along component cross-section, insert 750 replacing small cut plies and surrounded by full length plies.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hot section gas turbine engine component, comprising:
- a cured, reinforced, ceramic matrix composite portion comprising a plurality of continuous tows extending substantially parallel to each other in a matrix;
- a discontinuously reinforced composite portion having substantially isotropic properties located at regions of contour changes and thickness changes of the component, the discontinuously reinforced composite portion comprising discontinuous fiber-including material selected from the group consisting of fiber, tow, and chopped pre-preg plies in a matrix material;
- wherein the discontinuously-reinforced composite portion is adjacent to the reinforced ceramic matrix composite portion comprising the plurality of continuous tows, and the discontinuously reinforced composite portion is cured to the reinforced ceramic matrix composite portion.

2. The hot section gas turbine component of claim 1, wherein the cured, reinforced ceramic matrix composite portion further includes a plurality of groups of continuous tows in a matrix, the tows in each group extending substantially parallel to each other in a matrix and each group oriented at a preselected angle to the tows in at least one other group.

3. The hot section gas turbine component of claim 1 wherein a first group of tows is oriented at a first preselected angle selected from the group consisting of 0°, +45°, −45°, 90°, −45°, +45°, wherein the tows oriented at 0° are oriented parallel to an axis of the component, and the tows in the at least one other group adjacent to the first group are oriented at a second preselected angle different than the preselected angle of the adjacent group, the second preselected angle selected from the group consisting of 0°, +45°, −45°, 90°, −45°, +45°.

4. The hot section gas component of claim 1 wherein the discontinuously-reinforced composite portion having substantially isotropic properties located at regions of contour changes and thickness changes is located along a corner of a turbine component.

5. The hot section gas component of claim 1 wherein the discontinuously-reinforced composite portion having substantially isotropic properties located at regions of contour changes and thickness changes is positioned as a stiffener at a thickness change.

6. The hot section gas component of claim 1 wherein the fiber-including material has a size of from about 0.1 inch to about 1 inch.

7. The hot section component of claim 1 wherein the discontinuously-reinforced composite portion comprising discontinuous fiber-including material in a matrix material further includes a loading of about 10% by volume to about 50% by volume of fiber-including material in matrix material.

8. The hot section component of claim 1 wherein the turbine component is a narrow chord turbine blade and the discontinuously-reinforced composite portion having substantially isotropic properties is located in a trailing edge portion of the blade, a cured, reinforced, ceramic matrix composite portion bonded to the discontinuously reinforced composite portion.

9. The hot section component of claim 1 wherein the turbine component is a narrow chord turbine blade and the discontinuously-reinforced composite portion having substantially isotropic properties and wherein the portion is positioned at a change in contour adjacent an air passageway as a rib.

* * * * *